(No Model.)

H. O. SICKLER.
TRACTION ENGINE.

No. 380,601. Patented Apr. 3, 1888.

Witnesses.
J. G. Johnson
Harriet Johnson

Inventor.
Hernando O. Sickler
By James Sangster
Atty.

UNITED STATES PATENT OFFICE.

HERNANDO O. SICKLER, OF BUFFALO, NEW YORK.

TRACTION-ENGINE.

SPECIFICATION forming part of Letters Patent No. 380,601, dated April 3, 1888.

Application filed September 5, 1887. Serial No. 248,782. (No model.)

*To all whom it may concern:*

Be it known that I, HERNANDO O. SICKLER, a citizen of the United States, residing in Buffalo, in the county of Erie and State of New York, have invented certain new and useful Improvements in Traction-Engines, of which the following is a specification.

My invention relates, first, to certain new and useful improvements in traction-engines, whereby the greater portion of the weight rests on two small wheels adapted to run on rims attached to the inner sides of two large driving-wheels, the said wheels being made adjustable by means of a lever, so as to bring the weight either forward or back of the center of the two smaller wheels.

The second part of my invention relates to a certain means whereby the tractive power of the engine is greatly increased by means of a series of two or more cables or chains connected with the driving-wheels of the engine and vehicle, all of which will be fully and clearly hereinafter described and claimed, reference being had to the accompanying drawings, in which—

Figure 1:
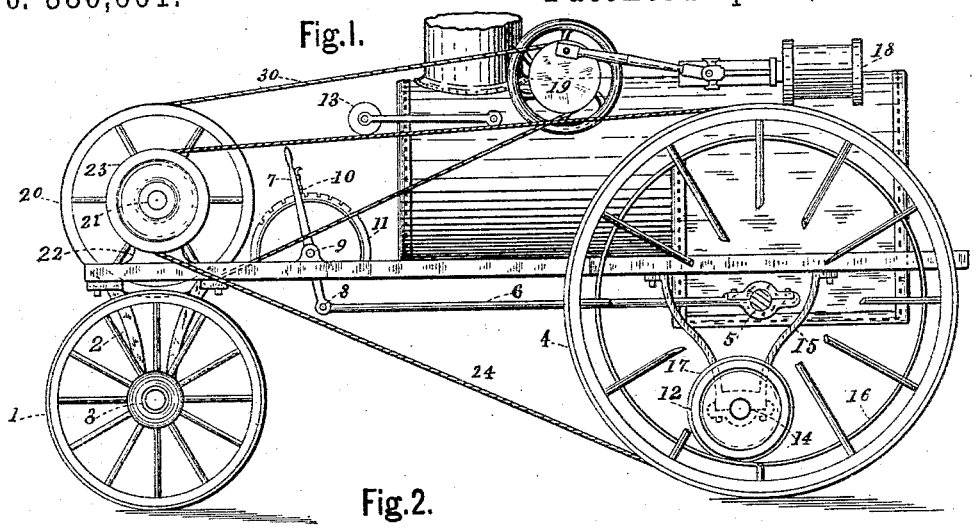
Figure 2:
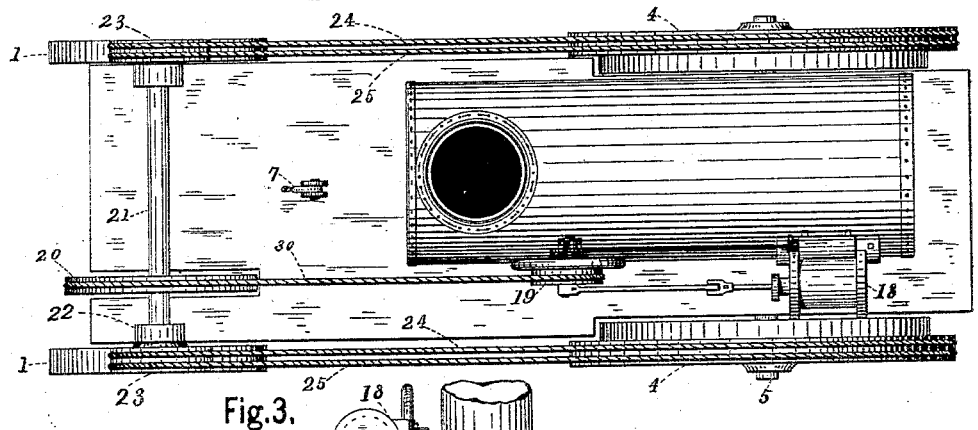
Figure 3:
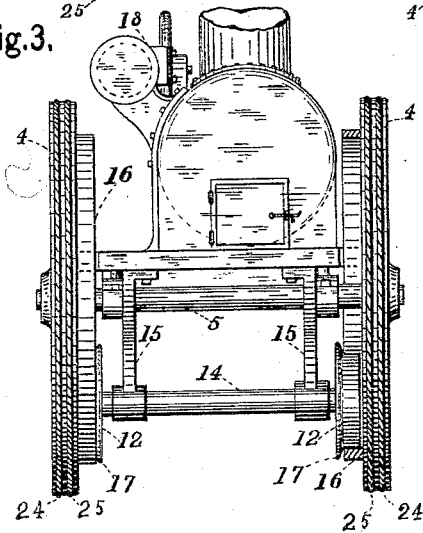

Figure 1 is a side elevation of the vehicle, a portion of the spokes of one of the rear driving-wheels being broken away, so as to show the mechanism beyond it more clearly. A portion of the smoke-stack is also left off. Fig. 2 is a top or plan view. Fig. 3 is a rear elevation.

In said drawings, 1 represents the front wheels of the vehicle. They are secured thereto in the usual way to a supporting-frame, 2, to which the axle 3 is secured in the ordinary manner.

4 is the rear driving-wheels, which are secured in the ordinary way to an axle, 5. The axle 5 is connected with a reach, 6, (shown in Fig. 1,) which extends forward under the vehicle, and is pivoted to a hand-lever, 7, by a pivot, 8, the lever 7 being pivoted to the vehicle by a pivot, 9. The lever 7 is adapted to be secured to any point to which it may be moved by means of a spring-bolt, 10, adapted to fit into either of the notches in the curved bar 11, (shown in Fig. 1;) but in some cases the bar 11 and bolt 10 may be dispensed with, as shown in Fig. 2.

It will now be seen from this construction that the rear wheels may be made to move backward or forward, so as to bring their centers either forward or back of the centers of the supporting-wheels 12, the slack in the cables being taken up by the tightening-pulleys 13, (shown in Fig. 1,) which are made and operated in the ordinary way for such purposes.

The object in making the driving-wheels capable of being moved back and forth longitudinally is to provide a means for assisting the vehicle over obstructions, as the supporting-wheels 12 may thus be made to bear either upon a point forward or back of the center of the driving-wheels.

The supporting-wheels 12 are connected to an axle, 14, and mounted on supporting-arms 15. They are fitted in their bearings so as to have no lateral movement, and run upon the rims 16, which rims are rigidly secured to the spokes of the driving-wheels on the inner sides of said wheels. The flanges 17 prevent the wheels 12 from moving sidewise on the rims 16.

The driving mechanism consists of an engine, 18, of any suitable construction. From the engine crank disk or pulley 19 (the periphery of which is grooved) is connected a suitable belt or cable, 30, which runs over a grooved pulley, 20, mounted on a shaft, 21, and supported in suitable bearings and supports, 22, on the platform of the vehicle. On the outer ends of the shaft 21 are two smaller grooved pulleys, 23, having one or more grooves in their peripheries. The rear wheels, 4, are also provided with corresponding grooves in their peripheries, the wheels 4 and pulleys 23 each having the same number of grooves.

From each of the driving-wheels 4 to the pulleys 23 is connected a series of cables, 24 25. I have shown two in the drawings; but more than that number may be used, if desired, and chain or chain-gearing may be used instead of the cables shown in the drawings.

From this construction it will be seen that when turning the driving-wheels the power is applied at the top of the wheels, thereby giving greater leverage in operating them than if applied at the center, and that a series of cables act as a track for the wheels to roll on, and very much increases the capacity of the machine to advance over the ground, and especially soft earth. I have not shown springs for supporting the body of the vehicle; but springs of any well-known construction may be used, if required.

I am aware that heretofore vehicles have been made having a truck of four wheels adapted to operate on the internal surface of two rims secured together by cross-bars. I therefore do not claim such, broadly; but What I do claim is—

1. In a traction-engine, the rear driving-wheels provided with inner side projecting rims, two smaller wheels mounted in fixed bearings on the body of the vehicle, and bearing upon the inner surfaces of the driving-wheel rims for supporting the weight of the vehicle, in combination with a reach connected by bearings with the axle of the driving-wheels, and an arm or lever pivoted to the reach and to the body of the vehicle, whereby the driving-wheels may be moved longitudinally back and forth, for the purposes substantially as described.

2. In a traction-engine, an engine-pulley connected by a cable with a grooved pulley mounted upon a shaft set in bearings on the platform of the vehicle and provided with two smaller pulleys, each having a series of grooves and located directly above the front wheels, in combination with the rear driving-wheels, each having a corresponding series of grooves, and a series of cables connecting said pulleys and driving-wheels, whereby the series of cables connect directly with the peripheries of the driving-wheels, so as to rest upon the ground and act as a track for the driving-wheels to roll upon, substantially as described.

3. The combination of the body of a vehicle provided with wheels 12, mounted in fixed bearings connected thereto, the driving-wheels provided with inner side rims, 16, and connected by bearings with a reach, a pivoted lever for connecting said reach with the body, and a curved bar, 11, and bolt 10, as and for the purposes described.

HERNANDO O. SICKLER.

Witnesses:
JAMES SANGSTER,
ARTHUR J. SANGSTER.